Feb. 22, 1966

B. E. FRUITS 3,236,271

INSERTED BIT SAW AND BIT THEREFOR

Original Filed July 3, 1963

INVENTOR.
Burl E. Fruits,
BY
Hood, Gust & Irish
Attorneys.

United States Patent Office 3,236,271
Patented Feb. 22, 1966

3,236,271
INSERTED BIT SAW AND BIT THEREFOR
Burl E. Fruits, Waynetown, Ind., assignor to Burl E. Fruits and Leokadia Fruits, Waynetown, Ind., a partnership
Continuation of application Ser. No. 292,529, July 3, 1963. This application Aug. 26, 1964, Ser. No. 393,482
3 Claims. (Cl. 143—141)

This is a continuation of my copending application Serial No. 292,529, filed July 3, 1963, for "Inserted Bit Saw and Bit Therefore," now abandoned.

The present invention relates to a circular saw of the inserted bit type, and to an improved bit therefor. The primary object of the invention is to provide a novel bit which, when used in such a saw, will act upon the chips or dust cut from the work by the bit in a novel manner, whereby the action of the saw as a whole will be significantly improved.

Inherently, a saw generally of the character here under consideration will cut a kerf which is slightly wider than the thickness of the blade or disc body, whereby clearance will be provided for rotation of the disc within the kerf substantially without frictional engagement between the disc and the work. Such a saw rotates at a relatively high speed, usually having a peripheral velocity of approximately 160′ per second. The transversely-flat, leading surfaces of the saw bits and their holders, moving at such velocities, entrain substantial masses of air, and those air masses, at relatively high velocity, are driven into the kerf ahead of the individual bits and holders. Thereby, some compression of air masses within the kerf is produced; and the air under pressure escapes largely in a radially-inward direction toward the axis of the saw, between the saw body and the lateral boundaries of the kerf. In conventional saws of the type under consideration, that flow of air toward the center of the saw body tends to carry chips and dust likewise radially inwardly with the result that debris collects and compacts within the gullets of the insert-receiving sockets and tends to enter the spaces between the opposite faces of the saw blade body and the lateral walls of the kerf, where it sets up a frictional condition which not only acts as a drag upon the saw body, thereby wasting power, but also tends to heat the blade within an accompanying warping action which produces "snaking" of the blade as it advances through the work. A further object of the present invention, then, is to provide a bit for such saws of such construction as to inhibit entrainment of chips and dust in the radially-inward flow of air escaping from the saw body gullets or sockets, and to force such chips and dust into a tangential path relative to the saw at velocities which at least temporarily exceed the velocity of the blade periphery.

A further object of the invention is to provide, in such a saw, bit structure which will guide the saw perimeter against deviation from a true plane as it moves through the work, without reliance upon the bit holders, whereby contact between the walls of the kerf and the bit holders, which might produce misalignment of the holders and would necessarily result in the generation of heat, will be avoided.

Still further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
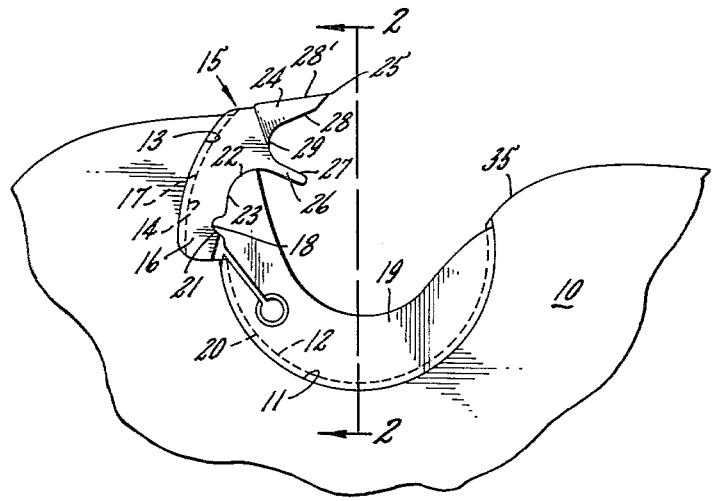
FIG. 1 is a side elevation of a fragment of the perimetrical region of a saw blade, illustrating a bit constructed in accordance with the present invention mounted in a conventional socket and retained therein by a conventional holder.

Referring more particularly to the drawings, it will be seen that I have indicated a fragment of a conventional circular disc saw body 10 which, in accordance with conventional practice, is provided with a peripheral series of radially-outwardly opening sockets 11 each of which is preferably formed with a V-shaped rib 12 and each of which communicates, at its rearward end, with an auxiliary socket 13 which is also preferably provided in its floor with a V-shaped rib 14.

My improved bit is indicated generally by the reference numeral 15, and said bit comprises a shank 16 which, at its rearward or back edge, is formed with a V-shaped channel 17 which snugly receives the rib 14 when the bit 15 is seated in the socket 13. In the form of bit shown, the shank 16 is further formed in its forward face or edge with a cavity 18.

A conventional holder 19 is adapted to be seated in the socket 11 and is formed on its rearward or radially inner edge with a continuous V-shaped channel 20 which, when the holder is in place, snugly receives the rib or ridge 12. Near its rearmost end, the holder 19 is formed with a projection 21 adapted to take a seat in the cavity 18; and at its rearmost extremity, the holder 19 is formed with a surface 22 suitably contoured for cooperative, retentive engagement with a corresponding surface 23 on the forward face of the bit shank 16. It will be perceived that the holder and bit may be snapped into place in the composite socket 11–13, whereupon the bit-and-holder assembly will be firmly retained in place.

At its distal end, the bit 15 is formed with a tooth 24 which projects forwardly and terminates at its distal end in a chisel edge 25 disposed in the active periphery of the saw. At a point between the tooth 24 and the region of engagement of the holder 19 with the bit shank 16, a toe 26 projects generally forwardly from the forward face of the shank 16. The radially-outward surface 27 of the toe 26 merges with the radially-inward or proximal surface 28 of the tooth 24 in a smooth, generally forwardly facing curved surface or throat 29, while the radially-inward surface of the toe meets the rear end of the outwardly facing edge 34 of the holder at an acute angle. In the preferred form of my invention, the angle included between the surfaces 27 and 28 is approximately 48°, and the angle included between the surface 27 and the radially-outward or distal surface 28′ of the tooth 24 is approximately 30°. The cutting edge 25 is defined, of course, by the intersection of said distal and proximal tooth surfaces. The toe surface 27 lies in a plane which, as is clearly shown in the drawings, intersects the holder 19 at a point adjacent the forward end of said holder. Thus, the plane of the surface 27 traverses the socket 11 substantially at the socket mouth.

Figure 4:
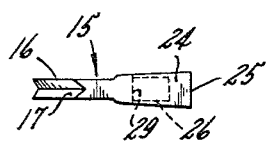
FIG. 4 is a top plan view of my improved bit.

In accordance with conventional practice, the lateral surfaces of the tooth 24 converge gently rearwardly from the chisel edge 25 in order to provide cutting clearance for the tooth. As is most clearly to be seen in FIGS. 2 and 4, the toe 26 is of substantially uniform width from its distal end to its proximal end, that width being less than the width of the edge 25 but greater than the width or thickness of the shank 16, the holder 19 or the blade body 10. In the optimum form of the invention, as illustrated, the width of the chisel edge 25 of the tooth 24 is 0.2580" and the width of the toe 26 is 0.2150" or approximately 85% of the width of the chisel edge of the tooth, while the width of the holder 19 and the thickness of the blade body 10 is approximately 0.150".

Figure 2:
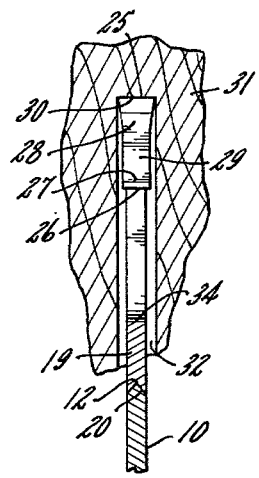
FIG. 2 is a fragmentary section taken substantially on the line 2—2 of FIG. 1 but showing the saw in work position in a kerf.

Thus, as will be apparent from a consideration of FIG. 2, the toe 26 will engage either side wall of the kerf 30 being cut in the work 31, upon any tendency of the saw to wander from a true cutting plane, before either the holder 19 or the blade body itself can possibly engage such a kerf wall.

My toe 26 is very thin in a radial direction. Thus, when the toe 26 does touch a kerf wall, the degree of resultant friction and heat generation is very small, and any marring of the surface of the kerf wall is minimized.

In the optimum form of invention, as illustrated, the tooth thickness, immediately behind the forward face of the chisel edge, is 0.091", while the radial thickness of the toe 26 is 0.058", or less than 65% of the tooth thickness.

Figure 3:
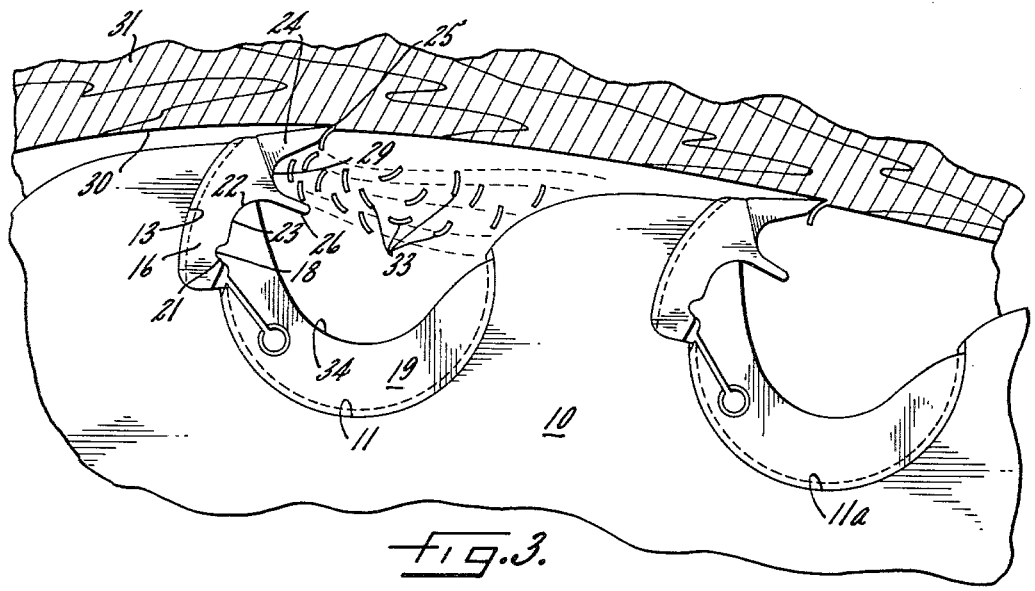
FIG. 3 is a fragmentary elevation showing two adjacent bit assemblies in working position in a kerf and somewhat diagrammatically illustrating what I presently believe to be the action of my bit upon chips when in operation.

It is my present theory that, as chips and dust, indicated at 33 in FIG. 3 of the present drawings are cut from the floor of the kerf 30 by the advancing chisel edge 25 of the tooth 24, they are discharged into the forwardly-rushing mass of air entrained in front of the throat 29 of the tooth 24 and are thus accelerated, in a line which is substantially tangential to the periphery of the saw, to a velocity approximating the saw perimeter velocity. However, the bit itself is moving somewhat faster than the air mass, and therefore the curved surface 29 of the throat will overtake the wood particles and will strike them, imparting to those particles a velocity exceeding that of the blade periphery, much in the manner in which a baseball or a golf ball is given a velocity which exceeds that of the bat or of the club head at the moment of impact. The tangential momentum of the particles, then, overcomes the tendency of radially-inwardly directed air flow above-described to entrain such particles, and consequently little, if any, of the debris will tend to be moved into the spaces 32 between the saw body and the kerf walls.

Whether or not the above theory is correct, the fact is that the movement of debris radially inwardly between the faces of the saw blade and the kerf walls, and even into the gullet of the holder 19, is very greatly reduced as compared with such movement when the bits of the prior art are used. This fact is most readily demonstrable when sawing frozen wood in extremely cold weather. Under those circumstances, it is found, with bits of the prior art, that a mass of chips and dust will collect and freeze to the kerf walls closely radially inwardly relative to the smoothly and concavely curved radially outwardly facing holder gullets 34 which join the surfaces 22 with the front ends of the radially inner edges of the several holders. Such frozen masses, of course, frictionally engage the saw to reduce its efficiency and, because they are non-uniform on opposite sides of the blade, they tend to cause wandering. It is found that sometimes debris will collect and freeze also in the holder gullets. Tests with my tooth in the same blade on the same wood under the same conditions produced no such frozen masses either on the kerf walls or in the holder gullets, though a small accumulation of debris, frozen in place on the blade surface 35 immediately ahead of the socket 11, was sometimes found.

A still further advantage of the bit disclosed herein resides in the fact that the surfaces 27 and 28 are substantially flat in their approaches to the smoothly curved throat 29. Because of that fact, the effectiveness of the tooth construction to produce the described action of debris is not reduced as the tooth 24 wears in use and/or is swaged. Although the length of the surface 28 is thus reduced, its relationship to the curved throat 29 and to the surface 27 is not thereby modified.

I claim as my invention:

1. In a circular saw of the inserted bit type comprising a disc having a plurality of circumferentially spaced-apart radially-outwardly opening bit and holder receiving sockets formed in its outer periphery, the combination with said disc of a bit and holder secured in each of said sockets, each of said holders having a radially inner edge engaging the respective socket, a rear edge joined to said inner edge at the rear end thereof, and a smoothly and concavely curved radially outwardly facing edge joined at its rear end to said rear edge and at its front end to said inner edge at the front end thereof, each of said bits comprising a shank portion having a rear edge engaging the respective socket and a forward edge engaging the rear edge of the respective holder, each of said bits further comprising a forwardly extending tooth integrally joined to the radially outer end of said shank portion, said tooth having radially inner and outer surfaces terminating in a chisel edge with said outer surface extending radially outwardly from said outer periphery of said disc, each of said bits further comprising a forwardly extending toe integrally joined to said shank portion radially inwardly from said tooth and radially outwardly from said forward edge, said toe having a dimension in the direction of saw rotation significantly exceeding its dimension measured radially of the saw, said toe having radially inner and outer surfaces, said outer surface of said toe having a rear portion merging smoothly with said inner surface of said tooth to form a concavely curved forwardly facing throat, said inner surface of said toe joining said rear end of said outwardly facing edge of the respective holder and defining an acute angle therewith, said outer surface of said toe having a straight forward portion lying in a plane traversing said socket substantially at the socket mouth.

2. A saw bit of the inserted type comprising a shank having an elongated back edge, a cutting tooth extending generally forwardly away from said back edge and located at one end of said shank, said tooth being formed to provided distal and proximal surfaces meeting in a cutting edge remote from said back edge, said shank having a forward edge near its other end cooperable with holder means, and a sawdust-deflecting toe integral with said shank, disposed between said tooth and said forward shank edge, extending generally forwardly, inclined away from said tooth at an angle within the range between 30° and 48° and having a dimension measured in a direction perpendicular to said back edge significantly exceeding its dimension measured in a direction parallel to said back edge.

3. The bit of claim 2 in which mutually facing surfaces of said tooth and said toe merge with each other in a smoothly curved throat.

References Cited by the Examiner

UNITED STATES PATENTS

| 1,687,448 | 10/1928 | Hildreth | 143—141 |
| 2,623,553 | 12/1952 | Dawson | 143—141 |
| 2,694,423 | 11/1954 | Lawson | 143—141 X |
| 2,734,534 | 2/1956 | Standal | 143—141 X |

WILLIAM W. DYER, Jr., *Primary Examiner.*